(12) United States Patent
Madathodiyil et al.

(10) Patent No.: US 9,215,507 B2
(45) Date of Patent: Dec. 15, 2015

(54) VOLUME CUSTOMIZATION

(75) Inventors: Baburaj Madathodiyil, Chennai (IN);
Saleem S. Mohammed, Chennai (IN);
Vijay Senthil, Chennai (IN);
Vinodkrishnan Surianarayanan,
Chennai (IN); Sampath Raman,
Tirunelveli (IN); Venkatesan Sriraman,
Chennai (IN)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 124 days.

(21) Appl. No.: 13/301,058

(22) Filed: Nov. 21, 2011

(65) Prior Publication Data
US 2013/0128119 A1      May 23, 2013

(51) Int. Cl.
| H04N 21/485 | (2011.01) |
| H04N 21/258 | (2011.01) |
| H04N 21/443 | (2011.01) |
| H04N 21/475 | (2011.01) |
| H04N 21/6547 | (2011.01) |
| H04N 21/658 | (2011.01) |
| H04N 5/44 | (2011.01) |

(52) U.S. Cl.
CPC ..... *H04N 21/4852* (2013.01); *H04N 21/25891* (2013.01); *H04N 21/443* (2013.01); *H04N 21/4751* (2013.01); *H04N 21/6547* (2013.01); *H04N 21/6582* (2013.01); *H04N 2005/4407* (2013.01); *H04N 2005/4435* (2013.01)

(58) Field of Classification Search
USPC .......................................................... 348/563
See application file for complete search history.

(56) References Cited

U.S. PATENT DOCUMENTS

| 6,760,635 B1* | 7/2004 | Bates et al. ...................... 700/94 |
| 2005/0028208 A1* | 2/2005 | Ellis et al. ........................ 725/58 |
| 2010/0212001 A1* | 8/2010 | Kashyap et al. .................... 726/7 |
| 2010/0222939 A1* | 9/2010 | Namburu et al. .................. 701/2 |
| 2011/0103598 A1* | 5/2011 | Fukui et al. ...................... 381/57 |

* cited by examiner

*Primary Examiner* — Jefferey Harold
*Assistant Examiner* — Justin Sanders

(57) ABSTRACT

A method may include identify an application launched in a device by a user or a program or a channel selected by the user for playing. The method may further include querying a database to determine whether the application, program, or channel is associated with preset volume settings, wherein the database includes information identifying preset volume settings for a plurality of applications, a plurality of programs, or a plurality of channels. The method may include setting, when the application, program, or channel is associated with preset volume settings, the volume according the preset volume settings during execution of the application or playing of the program or channel. The method may also include prompting the user to set volume settings associated with the application, program, or channel when the application is not associated with the preset volume settings.

20 Claims, 13 Drawing Sheets

VOLUME RULE TABLE 500-1

| PROFILE 502 | JOHN SMITH | SNR 518 | - | VOLUME 534 | 50% |
| APPLICATION 504 | DOOM | FREQUENCY BAND 520 | - | MAXIMUM VOLUME 536 | 70% |
| CONTENT NAME 505 | - | DISTANCE 522 | - | EQUALIZATION 538 | - |
| TIME 506 | - | OUTPUT DEVICE 524 | SPEAKER 259 | | |
| DAY 508 | - | CALLER LOCATION 526 | - | | |
| CHANNEL 510 | - | USERS PRESENT 528 | - | | |
| LOCATION 512 | - | AMBIENT NOISE 530 | - | | |
| GENRE 514 | - | AMBIENT LIGHT 532 | - | | |
| URL 516 | - | PRIORITY 533 | - | | |

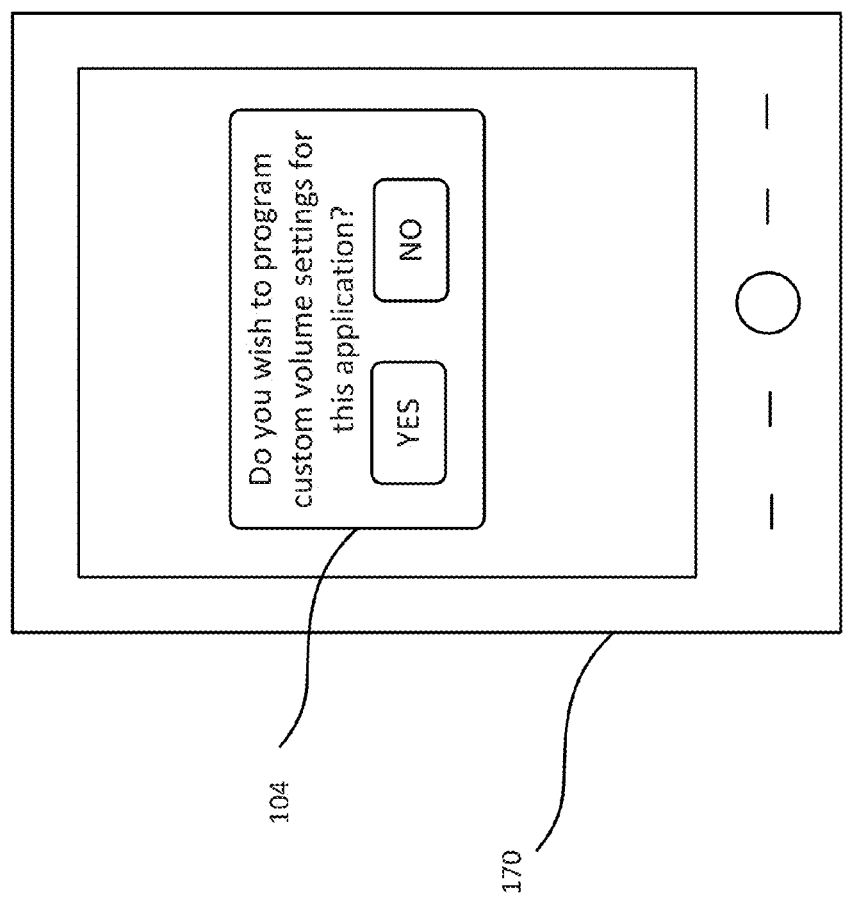

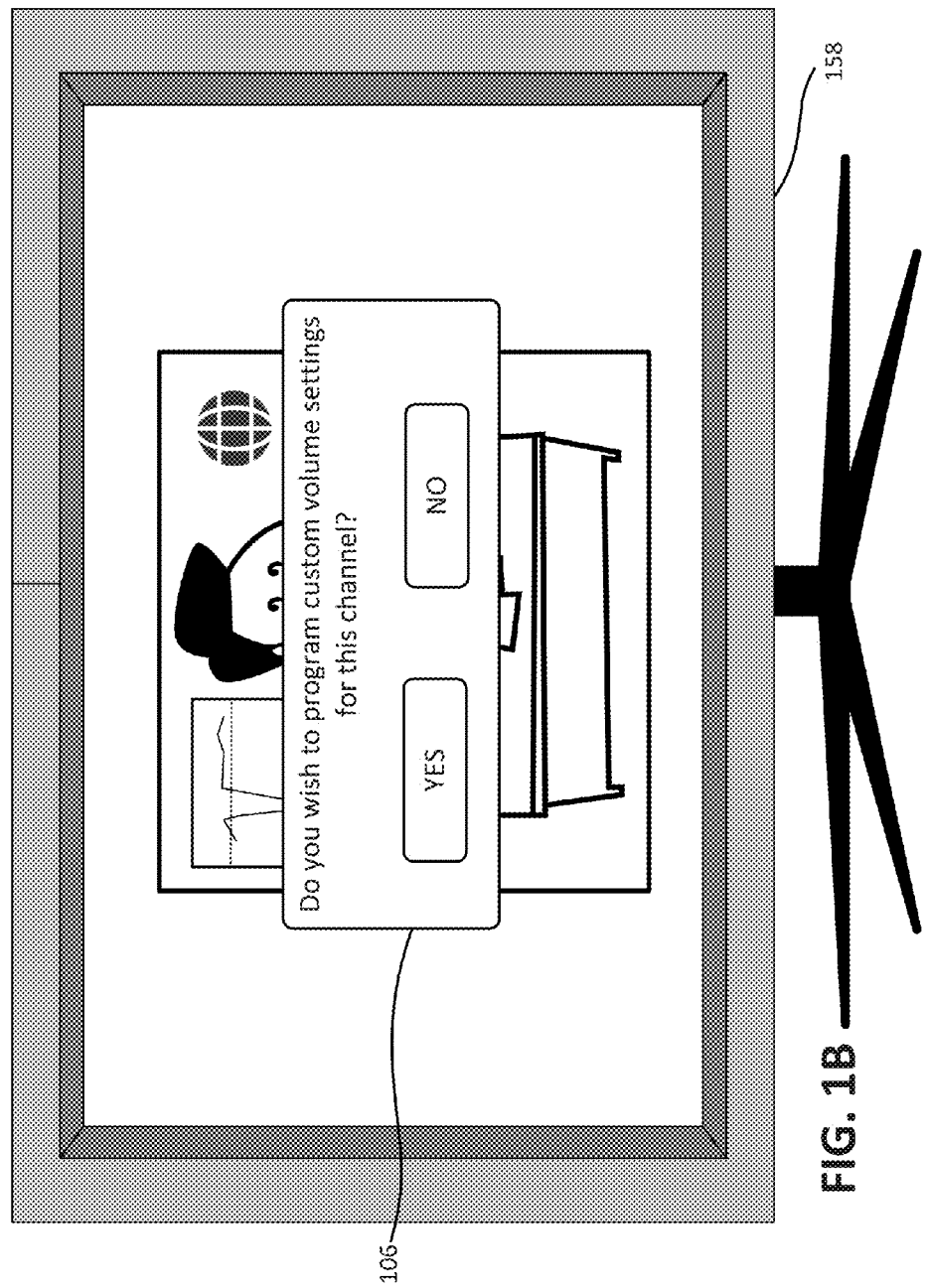

| VOLUME RULE TABLE 500-1 | | |
|---|---|---|
| PROFILE 502 | JOHN SMITH | |
| APPLICATION 504 | DOOM | |
| CONTENT NAME 505 | - | |
| TIME 506 | - | |
| DAY 508 | - | |
| CHANNEL 510 | - | |
| LOCATION 512 | - | |
| GENRE 514 | - | |
| URL 516 | - | |

| SNR 518 | - |
|---|---|
| FREQUENCY BAND 520 | - |
| DISTANCE 522 | - |
| OUTPUT DEVICE 524 | SPEAKER 259 |
| CALLER LOCATION 526 | - |
| USERS PRESENT 528 | - |
| AMBIENT NOISE 530 | - |
| AMBIENT LIGHT 532 | - |
| PRIORITY 533 | - |

| VOLUME 534 | 50% |
|---|---|
| MAXIMUM VOLUME 536 | 70% |
| EQUALIZATION 538 | - |

| VOLUME RULE TABLE 500-3 | | |
|---|---|---|
| PROFILE 502 | JOHN SMITH | |
| APPLICATION 504 | - | |
| CONTENT NAME 505 | - | |
| TIME 506 | 9PM-2AM | |
| DAY 508 | FRI, SAT | |
| CHANNEL 510 | - | |
| LOCATION 512 | - | |
| GENRE 514 | ACTION | |
| URL 516 | - | |
| SNR 518 | - | |
| FREQUENCY BAND 520 | - | |
| DISTANCE 522 | - | |
| OUTPUT DEVICE 524 | SPEAKER 259 | |
| CALLER LOCATION 526 | - | |
| USERS PRESENT 528 | JOHN, JOE | |
| AMBIENT NOISE 530 | - | |
| AMBIENT LIGHT 532 | - | |
| PRIORITY 533 | 1 | |
| VOLUME 534 | 80% | |
| MAXIMUM VOLUME 536 | 100% | |
| EQUALIZATION 538 | - | |

600A

VOLUME CUSTOMIZATION

BACKGROUND INFORMATION

Televisions and device applications typically allow a user to control the volume of audio associated with the television or application. For example, televisions and applications may allow for the volume to be increased or decreased. The control provided by the televisions and applications is limited.

BRIEF DESCRIPTION OF THE DRAWINGS

FIGS. 1A and 1B illustrate overviews of embodiments for customizing volume settings;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments disclosed herein allow for a user to customize volume settings in a mobile device, a set-top-box, a TV, a computer, etc. For example, FIGS. 1A and 1B illustrate embodiments in which a user is given the opportunity to customize volume settings when launching an application or viewing a channel. As shown in FIG. 1A, a mobile device 170 displays a dialog box 104 when the user launches an application. The user may program custom volume settings to apply to the application whenever it is executed. As shown in FIG. 1B, TV 158 displays a dialog box 106 when the user is watching a TV channel. The user may program custom volume settings to apply to the channel when the channel is being watched. The customizations may include the time of day, day of week, people present, ambient noise, ambient light, etc. The customizations may be extended in situations other than launched applications or television channels.

Figure 2:
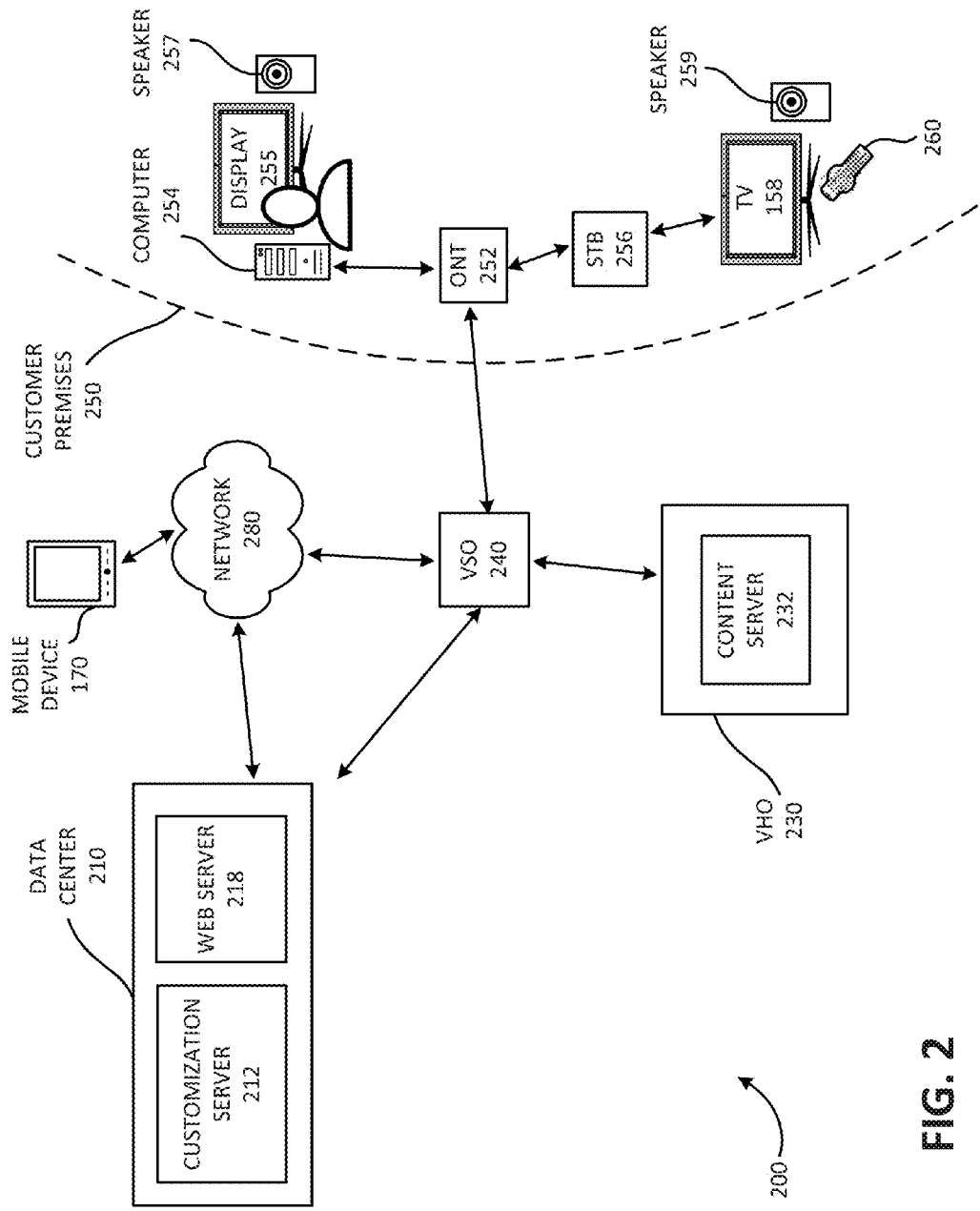
FIG. 2 is a diagram of an exemplary network for implementing the embodiments of FIGS. 1A and 1B and other embodiments for customizing volume settings.

FIG. 2 is a diagram of an exemplary network 200 for implementing the embodiment of FIG. 1 and other embodiments. Network 200 may include a data center 210, a video hub office (VHO) 230, a video service office (VSO) 240, customer premises 250, mobile device 170, and a network 280. VSO 240, VHO 230, data center 210, and other devices in network 200 may form part of a high-speed fiber optic network.

Customer premises 250 (e.g., a customer's home) may include an optical network terminal (ONT) 252, a personal computer 254, a set-top box (STB) 256, a television 158, an a remote control 260. Devices in customer premises 250 may include one or more computers for hosting programs, such as a program for a user to customize volume settings for applications, programs, or channels. Devices in customer premises 250 and mobile device 170 may be considered "user devices" or "network devices."

ONT 252 may receive data, e.g., on a fiber optic cable, and may transmit data to the appropriate device in customer premises 250, such as computer 254 or STB 256. Likewise, ONT 252 may receive data from any device in customer premises 250 and may transmit the data to other devices in network 200, e.g., through a fiber optic cable. ONT 252 may provide customer premises 250 with Internet access, television access, or telephone service, for example. In one implementation, network 200 may include a cable modem in customer premises 250 for receiving and transmitting data rather than an optical network terminal.

Computer 254 may include a laptop, a desktop, a tablet computer, a mobile telephone, or another computation and/or communication device. Computer 254 may include a microphone for capturing audio and/or a camera for capturing images or video. Computer 254 may also include a display 255 for showing images or video or a speaker 257 for playing audio. Computer 254 may connect to network 280 (e.g., the Internet) through ONT 252 and VSO 240, for example. Computer 254 may interact with data center 210 to provide a user with the ability to view content, download and run applications, and program customized volume settings. For example, personal computer 254 may provide the user with a browser.

STB 256 may receive content and output the content to TV 158 for display. STB 256 may include a component (e.g., a cable card or a software application) that interfaces with (e.g., plugs into) a host device (e.g., a personal computer, TV 158, a stereo system, etc.) and allows the host device to display content. STB 256 may also be implemented as a home theater personal computer (HTPC), an optical disk player (e.g., digital video disk (DVD) or Blu-Ray™ disc player), a cable card, etc. STB 256 may receive commands or data from other devices in network 200, such as remote control 260, and may transmit data to other devices in network 200 (e.g., to data center 210).

TV 158 may output content received from STB 256, for example. TV 158 may include speakers as well as a display (e.g., display 102 of FIG. 1). Remote control 260 may issue wired or wireless commands for controlling other electronic devices, such as TV 158 or STB 256. Remote control 260, in conjunction with STB 256, may allow a user to interact with an application running on STB 256, such as an application to view content or program custom volume settings. Remote control 260 may allow the user to control the volume of content being viewed on TV 158. Other types of devices (e.g., a keyboard, mouse, mobile phone, etc.) may be used instead of remote control 260.

Customer premises 250 may connect to VSO 240. VSO 240 may deliver content to customer premises 250 and may receive data from customer premises 250 for forwarding to the proper destination (e.g., data center 210). VSO 240 may include a server for transcoding and multiplexing content from different sources for delivery to customer premises 250.

VHO 230 may include a content server 232. Content server 232 may store and provide come (e.g., including on-demand programs). Content server 232 may also include a catalog of programs for a user to browse and select. Content Server 232 may also provide content from national broadcast channels, for example.

Network 280 may include one or more packet switched networks, such as an Internet protocol (IP) based network, a local area network (LAN), a wide area network (WAN), a personal area network (PAN), an intranet, the Internet, a cellular network, a fiber-optic network, or another type of network that is capable of transmitting data. Network 280, in conjunction with devices in network 200 (e.g., VSO 240), may allow user devices (e.g., computer 254, STB 256, TV 158, or mobile device 170) to connect to other devices also attached to network 280.

Mobile device 170 may include a mobile phone, a tablet computer, a laptop, or another portable communication device. In one embodiment, mobile device 170 may download and run applications, including applications from Apple's™ App Store, Amazon's™ Application store for Android or Kindle devices, Google's Marketplace for Android devices, Verizon's Application store for Android devices, etc. In one embodiment, mobile device 170 may include a standards-compliant web browser that can execute JavaScript, HTML5, etc.

Data center 210 may include one or more servers (e.g., "network devices") that manage and/or store programs and data associated with allowing users to experience content. As shown in FIG. 2, data center 210 may include a customization server 212 and a web server 218. Devices in data center 210 may include one or more computers for hosting programs, such as a web server (e.g., Apache), a database (e.g., MySQL), or other applications, Customization server 212 may include a database or server that stores information about user preferences, custom volume settings, or other information associated with a user. For example, customization server 212 may store lists of users and their associations with each other (e.g., parents, children, friends, family, classmates, etc.).

Web server 218 may allow for a user to interface with customization server 212 for programming volume customization rules, for example. Web server 218 may also function as a back-end server to coordinate communications between user devices and customization server 212.

The exemplary configuration of devices in network 200 is illustrated for simplicity. Network 200 may include more devices, fewer devices, or a different configuration of devices than illustrated in FIG. 2. For example, network 200 may include thousands or millions of customer premises. In some embodiments, the functions performed by two or more devices may be performed by any one device. Likewise, in some embodiments, the functions performed by any one device may be performed by multiple devices. Further, the connections shown in FIG. 2 are exemplary. In other embodiments, additional connections that are not shown in FIG. 2 may exist between devices each device may be connected to every other device). The connections in FIG. 2 may also be wireless or wired.

Figure 3:
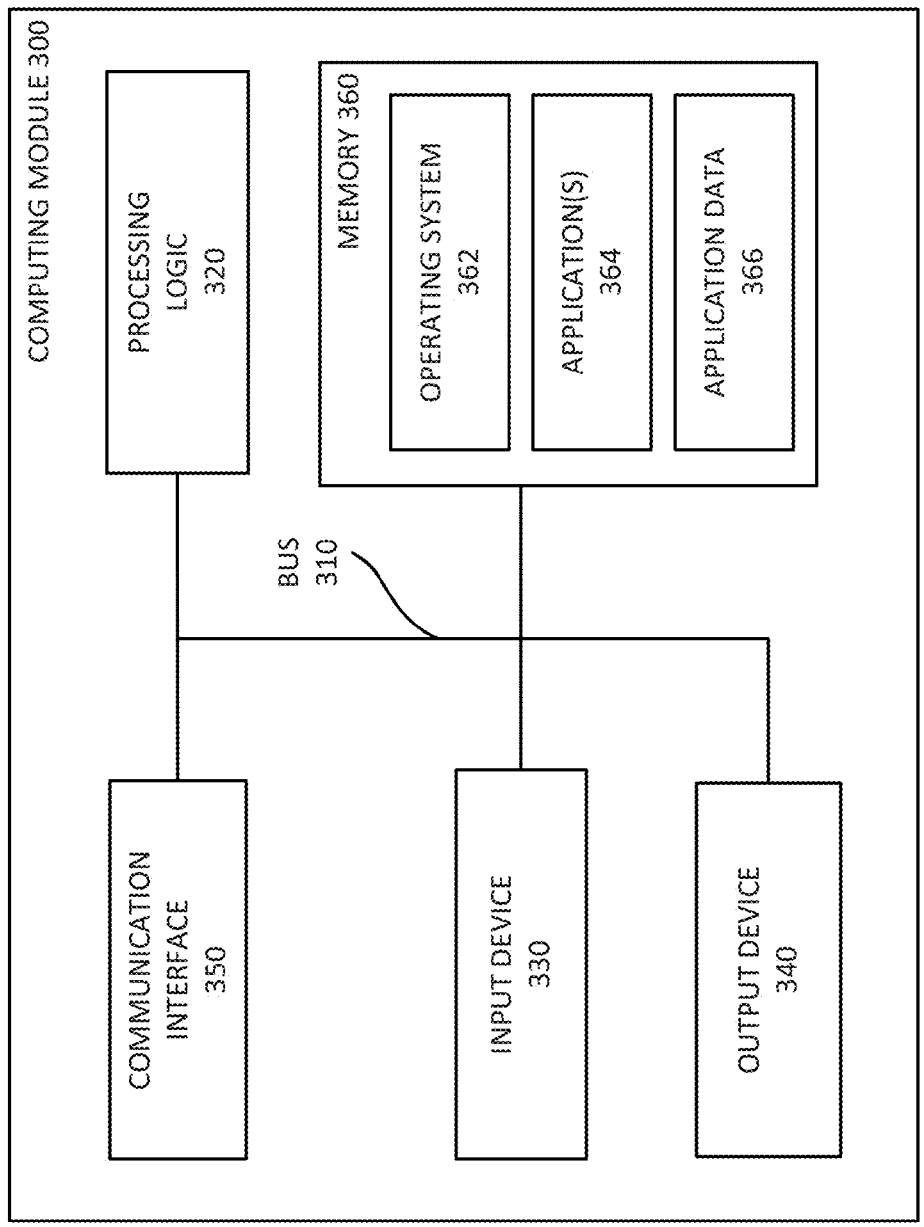
FIG. 3 is a block diagram of exemplary components of a computing module implemented in the devices of FIG. 2.

Devices in network 200 may each include one or more computing modules. FIG. 3 is a block diagram of exemplary components of a computing module 300. Computing module 300 may include a bus 310, processing logic 320, an input device 330, an output device 340, a communication interface 350, and a memory 360. Computing module 300 may include other components (not shown) that aid in receiving, transmitting, and/or processing data. Moreover, other configurations of components in computing module 300 are possible.

Bus 310 may include a path that permits communication among the components of computing module 300. Processing logic 320 may include any type of processor or microprocessor (or families of processors or microprocessors) that interprets and executes instructions. In other embodiments, processing logic 320 may include an application-specific integrated circuit (ASIC), a field-programmable gate array (FPGA), etc.

Input device 330 may receive information from, for example, a keyboard, a mouse, a pen, a microphone, a remote control (e.g., remote control 260), an audio capture device, an image and/or video capture device, a touch-screen display, etc. Some devices in network 200, such as servers in data center 210, may be managed remote (e.g., are "headless") and may not include a keyboard, a mouse, a microphone, etc.

Output device 340 may output information to the user. Output device 340 may include a display, a speaker, etc. For example, computer 254 may include speaker 257 to output audio to the user. STB 256 and/or TV 158 may be associated with a speaker 259 to output audio of programs being played on TV 158. As another example, TV 158 and/or personal computer 254 may include a display (an output device), which may include a liquid-crystal display (LCD) for displaying content to the user. For example, computer 254 may include display 255. As another example, ONT 252 and STB 256 may include light-emitting diodes (LEDs). Headless devices, such as servers in data center 210 may be managed remotely and may not include a display.

Input device 330 and output device 340 may allow a user to activate and interact with a particular service or application, such as a web browser or an application to customize volume settings in applications, programs, or channels. Input device 330 and output device 340 may allow a user to receive and view a menu of options and select from the menu options. The menu may allow the user to select various functions or services associated with applications executed by computing module 300.

Communication interface 350 may include a transceiver that enables computing module 300 to communicate with other devices or systems. Communication interface 350 may include a transmitter that converts baseband signals to radio frequency (RE) signals or a receiver that converts RF signals to baseband signals. Communication interface 350 may be coupled to an antenna for transmitting and receiving RF signals. Communication interface 350 may include a network interface card, e.g., Ethernet card, for wired communications or a wireless network interface (e.g., a WiFi) card for wireless communications. Communication interface 350 may also include, for example, a universal serial bus (USB) port for communications over a cable, a Bluetooth™ wireless interface, a radio-frequency identification (RFID) interface, a near-field communications (NFC) wireless interface, etc.

Memory 360 may store, among other things, information and instructions (e.g., applications 364 and operating system 362) and data (e.g., application data 366) for use by processing logic 320. Memory 360 may include a random access memory (RAM) or another type of dynamic storage device, a read-only memory (ROM) device or another type of static storage device, and/or some other type of magnetic or optical recording medium and its corresponding drive (e.g., a hard disk drive).

Operating system 362 may include software instructions for managing hardware and software resources of computing module 300. For example, operating system 362 may include Linux, Solaris, Windows, OS X, iOS, Android, an embedded operating system, etc. Applications 364 and application data 366 may provide network services or include applications, depending on the device in which the particular computing module 300 is found.

Computing module 300 may perform the operations described herein in response to processing logic 320 executing software instructions stored in a computer-readable medium, such as memory 360. A computer-readable medium may include a physical, logical, and/or non-transitory memory device. The software instructions may be read into memory 360 from another computer-readable medium or from another device via communication interface 350. The software instructions stored in memory 360 may cause processing logic 320 to perform processes that are described herein.

Figure 4A:
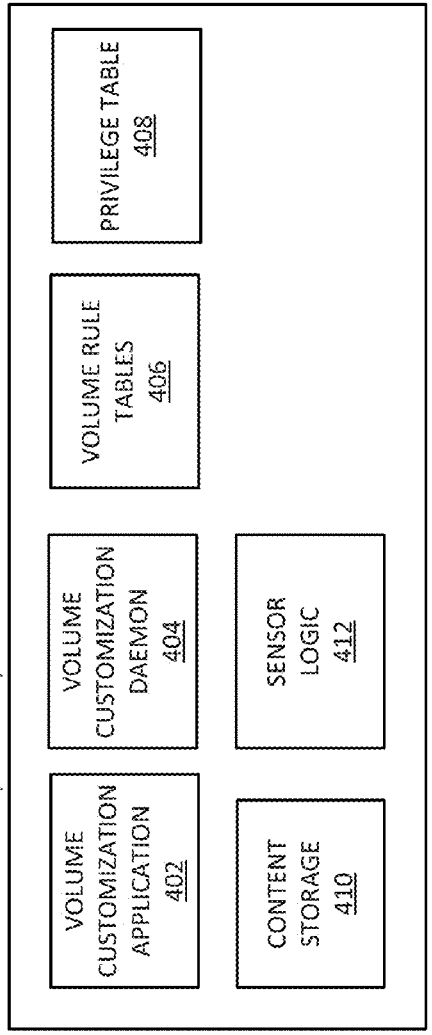
FIG. 4A is a block diagram of exemplary components of the mobile device, set-top-box, or computer of FIG. 2.

As described above with respect to FIG. 2, STB 256, computer 254, and/or mobile device 170 may allow a user to set customize volume settings for applications, channels, programs, time of day, day of week, etc. FIG. 4A is a block diagram of exemplary components of STB 256, computer 254, or mobile device 170 (e.g., functions performed by application 364 executed by processing logic 320 or stored in memory 360 of STB 256, mobile device 170, or computer 254). STB 256, mobile device 170, or computer 254 may include a volume customization application 402, a volume customization daemon 404, volume rule tables 406, privilege table 408, content storage 410, and/or sensor logic 412. Mobile device 170, STB 256, and computer 254 may include more devices, fewer devices, or a different configuration of devices than illustrated in FIG. 4A.

Volume customization application 402 may provide the user with an interface to customize the volume for different programs, channels, applications, etc. The volume settings may depend on location, the time of day, the day of week, etc. For example, John Smith may employ volume customization application 402 to customize the volume for programs played on the History Channel. Volume customization application 402 may store customized volume settings in volume rule tables 406, discussed below. In one embodiment, volume customization application 402 and daemon 404 may include an application purchased or downloaded, for example, from Apple's™ App Store, Amazon's™ Application store for Android or Kindle devices, Google's Marketplace for Android devices, Verizon's Application store for Android devices, etc.

Volume customization daemon 404 is a process or program that runs in the background to implement the volume customization rules stored in volume rule tables 406. For example, volume customization daemon 404 may sense when a channel is selected (e.g., the History Channel) and adjust the volume according to the rules stored in volume rule tables 406. Volume customization daemon 404 may use many parameters that relate to rules stored in rule tables 406. That is, daemon 404 may receive information from sensors in mobile device 170, STB 256, and/or computer 254. In one embodiment, daemon 404 may (e.g., in mobile device 170) determine the ambient noise conditions, the ambient light conditions, the location of mobile device 170, the location of a calling party, etc., for the application of rules stored in rule tables 406.

Figure 5A:
FIGS. 5A, 5B, and 5C are a diagrams of an exemplary volume rule table stored in the set-top box, mobile device, or computer of FIG. 2.
Figure 5B:
Figure 5C:

Volume rule tables 406 stores the conditions, criteria, and volume settings for the customization of the volume for a device, such as mobile device 170, STB 256, or computer 254. FIGS. 5A-5C, discussed below, provide example of volume rule tables 406. Privilege table 408 may determine which users can edit or manage the volume settings of other users. For example, privilege table 408 may determine that a parent can edit and determine the volume settings of that parent's child.

Content storage 410 may include music, recorded programs, etc., at a user may play on mobile device 170, STB 256, and/or computer 254.

Sensor logic 412 may sense or determine different parameters (e.g., in and around mobile device 170, STB 256, or computer 254). Sensor logic 412 may identify the users watching TV 158, for example, and their associated profiles (e.g., stored in a user profile database). Sensor logic 412 may use a tight-sensitive diode to determine the ambient light. Sensor logic 412 may use a microphone to determine the ambient sound. Sensor logic 412 may query other processes in mobile device 170, STB 256, or computer 254 to determine the time of day, the day of week, the channel currently being played (e.g., by STB 256), the URL being visited (e.g., by a web browser), or the default audio output device. Sensor logic 412 may query databases to determine the genre of a current program being played, for example, In one embodiment, sensor logic 412 may determine the users in front of or around TV 158. In this embodiment, sensor logic 412 may detect REID tags carried by users (e.g., using NFC technology, Bluetooth, etc.) and associated with profiles. In another embodiment, sensor logic 412 may detect hardware addresses associated with wireless devices and associated with user profiles. In another embodiment, sensor logic 412 may use a microphone or a camera and voice/face recognition software (or other biometric devices) to determine the users in front of or nearby TV 158 and their associated profiles. As yet another example, sensor logic 412 may detect users and profiles by virtue of a user "logging in" to an account associated with a profile.

Figure 4B:
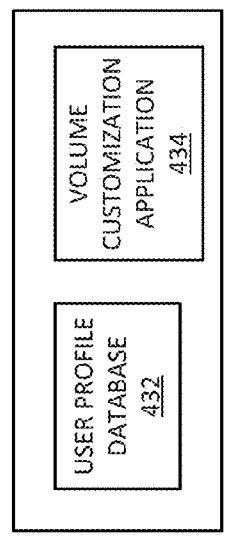
FIG. 4B is a block diagram of exemplary components of the customization server FIG. 2.

FIG. 4B is a block diagram of exemplary components of customization server 212 in one embodiment (e.g., functions performed by application 364 executed by processing logic 320 or stored in memory 360 of customization server 212). Customization server 212 may include user profile database 432 and volume customization application 434. Customization server 212 may include more, fewer, or a different arrangement of components than illustrated in FIG. 4B, Volume customization application 434 may perform many of the same functions described above with respect to volume customization application 402 and/or volume customization daemon 404 in STB 256, mobile device 170, or computer 254. In this embodiment, data center 210 may replace or supplement the functionality of STB 256, mobile device 170, or computer 254. In other words, the logic to determine the volume may be "in the cloud" and provided "over the top" by data center 210 to user devices, such as mobile device 170.

User profile database 432 may store a database of user profiles. A user profile may store information about a user's preferences (e.g., volume customizations) or other information associated with a user. User profile database 432 may also store a list of other users (e.g., contacts) associated with a particular user (e.g., friends, classmates, followers, family, etc.). User profile database 432 may identify users or groups of users who may be granted permissions to set volume customization settings associated with a particular user (e.g., privilege table 408). In one embodiment, a user profile may store simply an identification of the user.

FIGS. 5A, 5B, and 5C are diagrams of exemplary volume rule tables 500 (individually "rule table 500-x"). Volume rule tables 500 may store the customized rules for volume control. As shown in FIG. 5A, rule table 500-1 includes a profile field 502, an application field 504, a content name field 505, a time field 506, a day field 508, a channel field 510, a location field 512, a genre field 514, a URL field 516, a SNR field 518, a frequency band field 520, a distance field 522, an output device 524, a caller location field 526, a users present field 528, an ambient noise field 530, an ambient light field 532, a volume field 534, a maximum volume field 536, and an equalization field 538. Rule tables 500 may include fewer, more, or different fields or different data structures than shown in FIG. 5A.

Fields 502 through 533 express conditions or criteria that when met invoke the volume settings listed in fields 534-538. Rule table 500-1 shows one rule, e.g., one set of criteria and one set of volume settings. Likewise, rule table 500-2 shows another rule with volume settings, and rule table 500-3 shows another rule with volume setting. Many rule tables defining many different rules are possible.

Profile field 502 identifies the profile(s), person(s), or user account(s) with which the remaining data in table 500-1 is associated. Thus, the rule specified in table 500-1 may only apply when the person associated with profile field 502 is logged into STB 256 or mobile device 170. For example, a profile field specifying "John" indicates that the information in table 500-1 is associated with the user profile for John Smith.

Application field 504 specifies the application, game, etc., associated with the rule. For example, if application field 504 specifies "Doom," then the volume settings in fields 534-538 would only apply to the sound output from the application named "Doom." Application field 504 may also identify multiple applications or a group of applications for which volume settings in fields 534-538 apply.

Content name field 505 may identify a piece of content by name (e.g., title), number, season number, episode number, etc. For example, if the content name field 505 specified the name "The Simpsons" as the title, then the volume settings in fields 534-538 would only apply to the sound output when a program with that title was played. Content name field 505 may also identify multiple content filenames or a group of content filenames for which volume settings in fields 534-538 apply.

Time field 506 may specify the time for which the volume settings in fields 534-538 apply. For example, time field 506 may specify 12:00 am-8:00 am. In this case, the volume in fields 534-538 would only apply from midnight to 8 in the morning.

Day field 508 may specify the day for which the volume settings in fields 534-538 apply. For example, day field 508 may specify Monday-Friday. In this case, the volume in fields 534-538 would only apply on week days.

Channel field 510 may specify the channel for which the volume settings in fields 534-538 apply. For example, channel field 510 may specify the "History Channel." In this case, the volume in fields 534-538 would only apply for content being played from the History Channel. Channel field 510 may also identify multiple channels or a group of channels for which volume settings in fields 534-538 apply.

Location field 512 may specify the location for which the volume settings in fields 534-538 apply. For example, the location may specify "work," "home," "temple," "church," etc. Thus, for mobile device 170, the volume settings in fields 534-538 may change depending on the location of the device.

Genre field 514 may specify the genre (e.g., the category of artistic composition) of a program for which the volume settings in fields 534-538 apply. For example, genre field 514 may specify "comedy," "drama," "action," etc. In this case, the volume in fields 534-538 would only apply for content in the "action genre" if genre field 514 specified "action."

URL field 516 may specify the domain for which the volume settings in fields 534-538 apply. For example, URL field 516 may specify "youtube.com." In this case, the volume settings in fields 534-538 would not apply unless the domain from which the volume originated was youtube.com.

SNR field 518 may specify the signal-to-noise ratio (e.g., of the sound being played) for which the volume settings in fields 534-538 apply. For example, fir audio with a high noise component, a user that is hard-of-hearing may specify a higher volume.

Frequency band field 520 may specify the frequencies bands (e.g., of the sound being played) for which the volume settings in fields 534-538 apply. The frequency bands may be specified in Hertz and power. For example, if audio has a lot of power in high frequency bands, then the user may wish for the volume settings to be lower.

Distance field 522 may specify a distance of the listener away from the audio source for which the volume settings in fields 534-538 apply. For example, the farther the listener is away from the audio source, the louder the volume settings may be.

Output device 524 may specify the audio device for which the volume settings in fields 534-538 apply. For example, if the output device includes detached speakers with a subwoofer, then a different volume setting may be applied than if the output device is only the internal speakers to mobile device 170.

Caller location field 526 may specify the location of the caller for which the volume settings in fields 534-538 apply. For example, if a caller is located in a public venue (e.g., at a stadium), then the volume settings may be louder so that the person receiving the call can better hear the caller.

Users present field 528 specifies the listeners for which the volume settings in fields 534-538 apply. For example, field 528 may specify "John and Joe." In this case, the specified volume settings in fields 534-538 apply only when John and Joe are present.

Ambient noise field 530 specifies the ambient noise levels for which the volume settings in fields 534-538 apply. For example, in a noisy listening environment, the specified volume may be higher so that the listener can better hear the content being played.

Ambient light field 532 may specify the ambient light conditions for which the volume settings in fields 534-538 apply. For example, in a dark environment, the specified volume may be lower. In a bright environment, the specified volume may be higher.

Priority field 533 specifies which rule to apply if there are multiple rule tables whose conditions or criteria are met. For example, if the conditions in rule table 500-1 are met and the conditions in rule table 500-2 are also met, then the volume settings for the rule table that has the lower priority number will be applied. Priority field may be expressed as a number between 1 and 100 for example.

Volume field 534 specifies the volume to be applied to the applicable audio when the conditions and criteria specified in fields 502-533 are met. The volume may be specified as a percentage of the maximum value e.g., a number between zero (no sound) and 100 (full volume)). The volume may be specified qualitatively (e.g, soft/low, medium/normal, or loud), for example. For example, this volume includes the volume to start an application or channel. The volume may also be expressed as a function based on any one or more of the values stored in fields 502-533. For example, the volume level may increase steadily as the listener moves away from the audio source (e.g., a function of distance field 522). The volume may decrease steadily as the light slowly dims (e.g., a function of ambient light field 532). The volume may increase steadily as the light slowly brightens (e.g., a function of ambient light field 532). The volume may decrease as a function of time (e.g., a function of time field 506), etc.

Maximum volume field 536 specifies the maximum volume allowed for the applicable audio when the conditions and criteria specified in fields 502-533 are met. The maximum volume may be specified as a percentage (e.g., a number between zero (no sound) and 100 (full volume)). The maximum volume may be specified qualitatively (e.g., soft/low, medium/normal, or loud), for example. After the volume automatically starts, for example, at the level specified in volume field 534, then the user may increase the volume until the maximum volume 536 is reached. The maximum volume may also be expressed as a function (e.g., that varies continuously) of any of the values stored in fields 502-533.

Equalization field 538 may specify the volume for different audio frequency bands to be applied to the applicable audio when the conditions and criteria specified in fields 502-531 are met. The volume may be specified as a percentage of the maximum volume (e.g., a number between zero (no sound) and 100 (full volume)). The volume may also be specified qualitatively, such as soft/tow, medium/normal, or loud. The frequency band may be specified in Hertz (high and low). Multiple frequency bands may be specified in equalization field 538 (e.g., 0-1000 Hz; 1000-5000 Hz; 5000-10000 Hz; 10000-15000 Hz; 15000-20000 Hz).

Figure 6A:
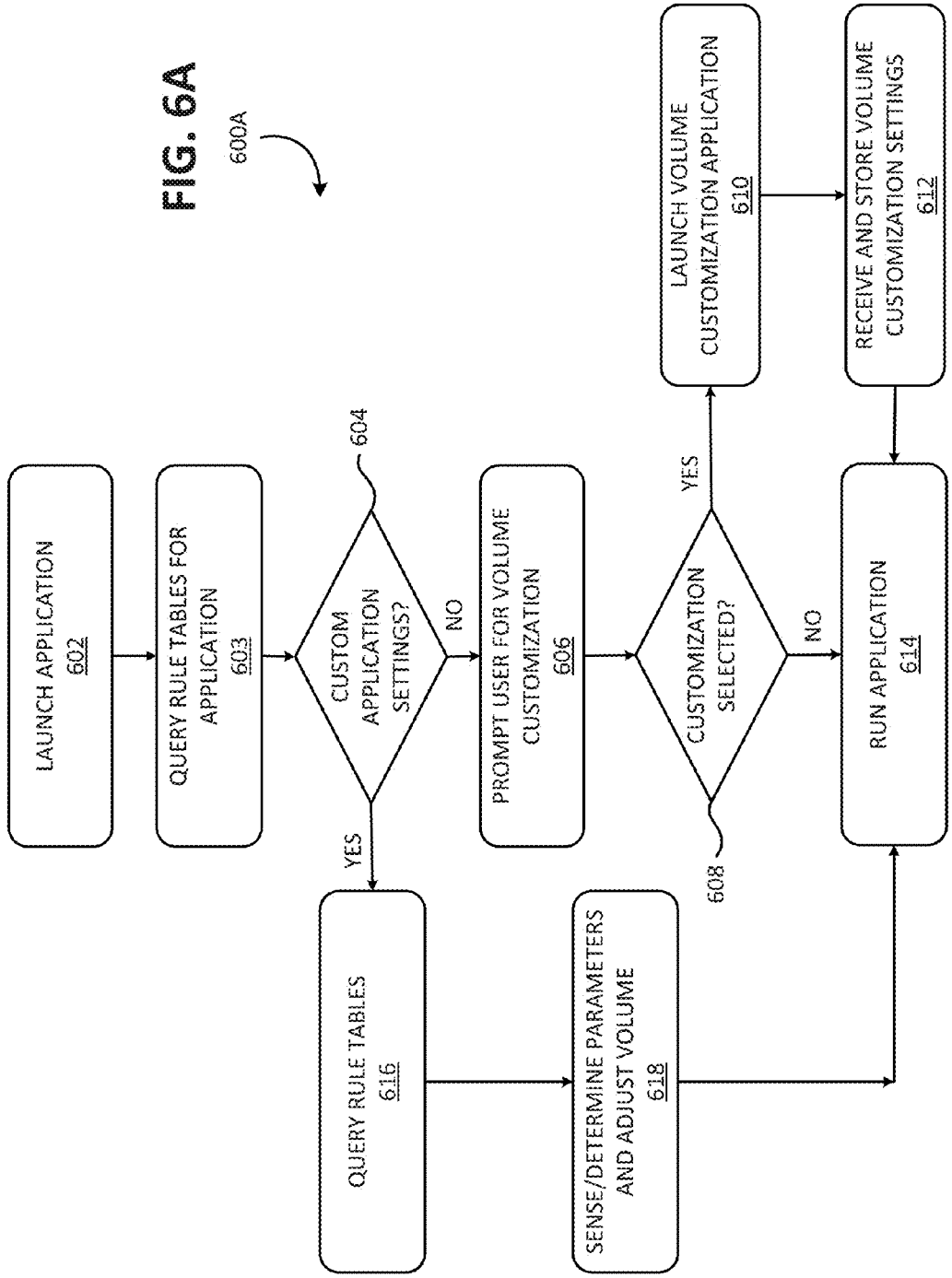
FIGS. 6A, 6B, and 6C are flowcharts of exemplary processes for the customization of volume controls.
Figure 6B:
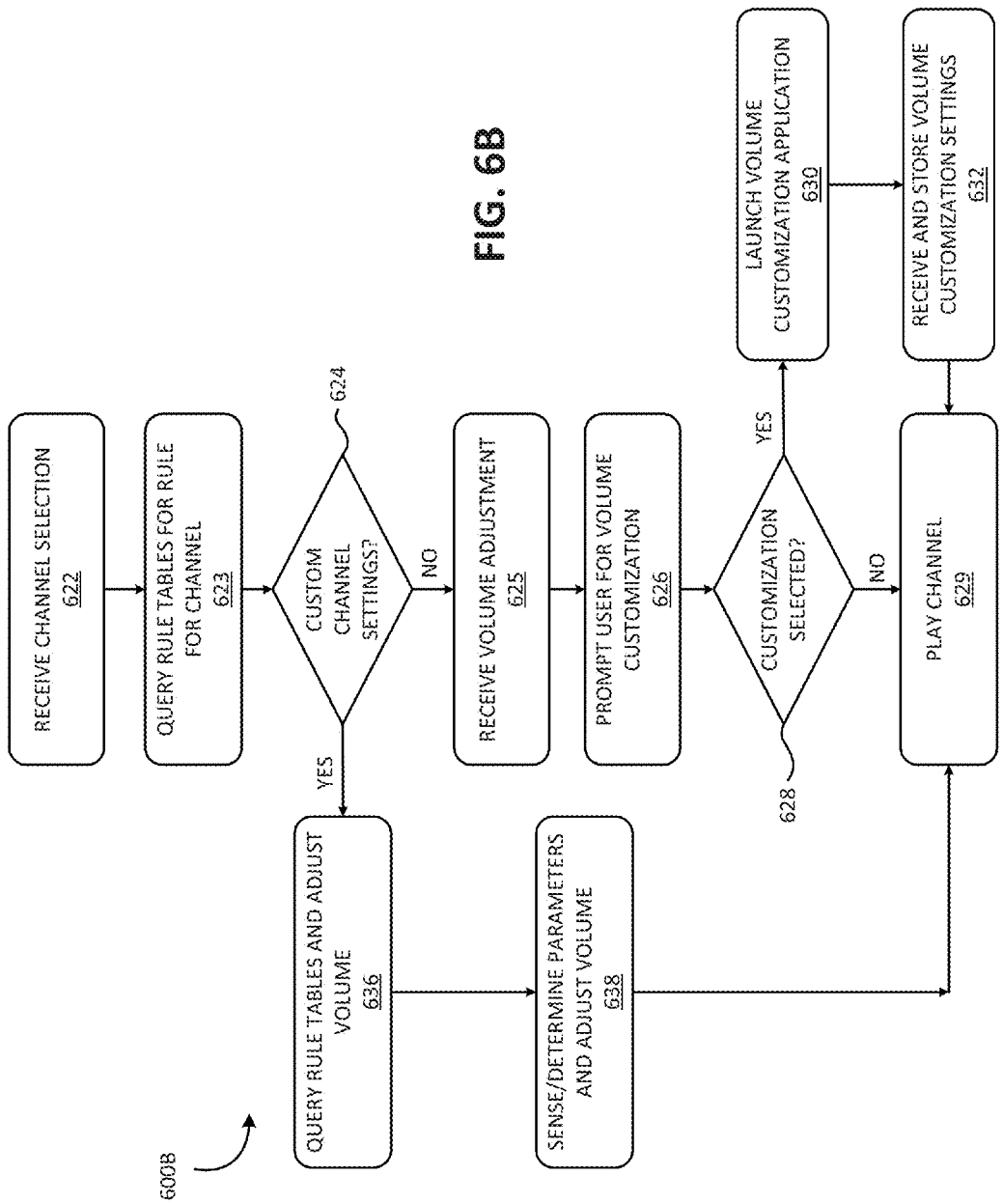
Figure 6C:
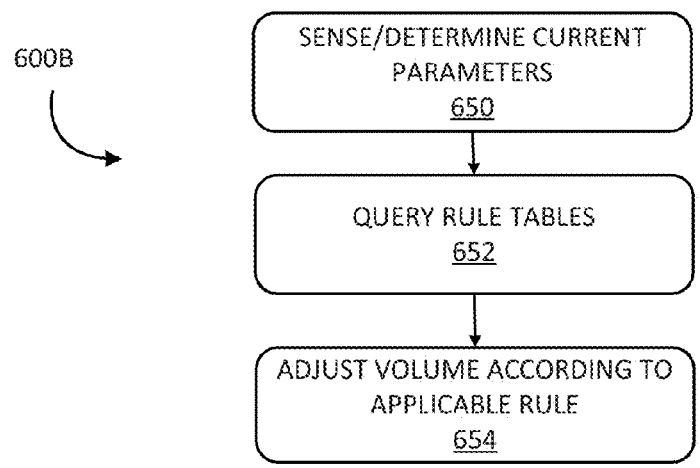

As discussed above, volume rule tables 500 may be used for customizing the volume for users. FIGS. 6A, 6B, and 6C are flowcharts of processes 600A, 600B, and 600C for the customization of volume controls. The description of process 600A includes an example in which the user is a customer named John Smith. In this example, John sits in front of TV 158 at home (e.g., customer premises 250) and uses remote control 260 to control TV 158 and STB 256. John uses remote control 260 and STB 256 to surf channels, launch applications, play games, etc. Process 600A begins with the user instructing STB 256 to launch an application (block 602). For example, John may select and launch the application named "Doom" (e.g., a game application). In this example, volume customization daemon 404 may sense that the application "Doom" has been launched.

The rule tables may be queried to determine whether the volume settings for the launched application have been programmed (block 603). In this case, volume customization daemon 404 may query rule tables 500 stored in STB 256. If there is no rule regarding the launched application (block 604: NO), then the user may be prompted to determine if the user wishes to customize the volume for the application (block 606). In this example, it is assumed that table 500-1 in rule tables 500 does not yet exist. As shown in FIG. 1A, the user may be prompted with a dialog box 104 asking "do you wish to program custom volume settings for this application?" Although dialog 104 is shown in FIG. 1A as appearing on mobile device 170, dialog box 104 may also appear on TV 158. In this example, the user selects "YES" or "NO" using remote control 260.

If the user does not wish to customize the volume control for the application (e.g., a "NO" selection is received by STB 256) (block 608: NO), then the application runs without customizing the volume control for the application (block 614). In one embodiment, the dialog box is automatically removed if the user does not respond within a certain period of time (e.g., 3, 5, 10, 15, or 30 seconds). During execution of the application (block 614) (e.g., whether or not customization has been selected), the user may control the volume by using remote control 260.

Figure 7A:
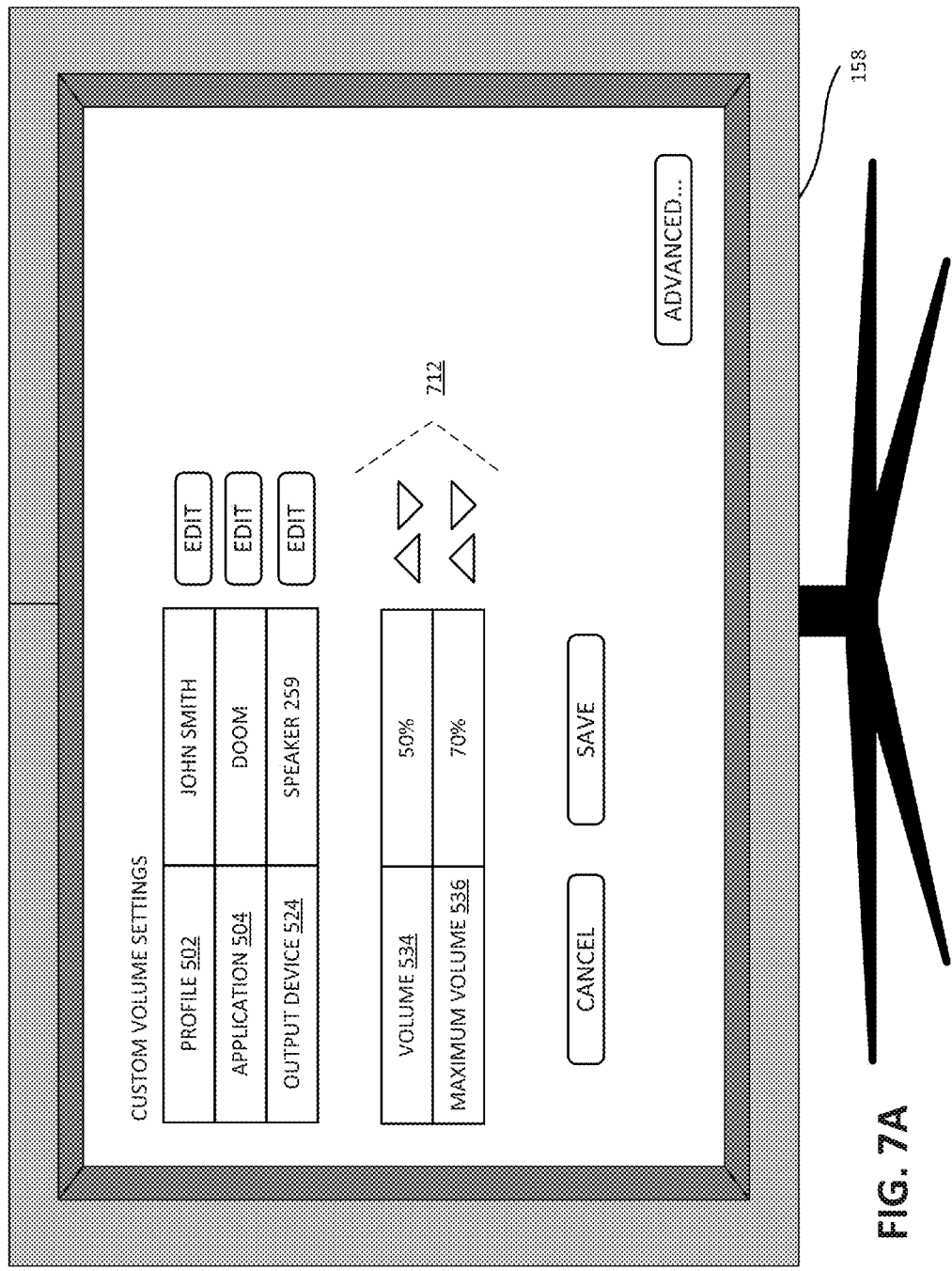
FIGS. 7A and 7B illustrate a television in an example.

If the user does wish to customize the volume control for the application (e.g., a "YES" selection is received by STB 256) (block 608: YES), then volume customization application 402 may be launched (block 610). In this example, as shown in FIG. 7A, profile field 502, application field 504, and output device field 524 may be automatically populated (e.g., for the profile "John Smith," the launched application "Doom," and the default "speaker 259"). The user may edit these fields by selecting the "EDIT" button using remote control 260. The user may also program the custom volume settings by selecting the up and/or down arrows 712. By hitting the SAVE button, the user may save the volume settings. By hitting the ADVANCED button, the user may alter the other settings, such as all those described above with respect to rule tables 500. The volume customization settings are received and stored by the volume customization application (block 612). For example, John may enter the volume setting information to be stored in table 500-1. In this fashion, when the application is launched again (block 602), then the user may not be prompted to customize the volume settings (e.g., block 606 is no performed). In addition, upon saving the selections, the application will be executed in accordance with the saved information.

If the application already has custom application settings (block 604: YES), then the appropriate rule table is queried to determine the volume settings for adjusting the volume accordingly (block 616). For example, when John Smith launches the application "Doom" again then rule table 500-1 includes the custom volume settings for the application. In this case, STB 256 queries rule table 500-1 for the appropriate volume settings (e.g., 50% of the maximum in this example). The appropriate parameters may be sensed or determined (block 618). For example, a rule for an application may depend on the time of day (time field 506) or the day of the week (day field 508). In this case, the current time may be determined for comparison to time field 506 or day field 508.

The application is allowed to run (block 614) with, for example, the adjusted volume. During execution of the application (block 614), the user may still control the volume by using remote control 260 (e.g., within the parameter set by the corresponding rule). In one embodiment, the user may not increase the volume beyond the volume specified in maximum volume field 536.

FIG. 6B is a flowchart of an exemplary process 600B for customizing volume settings while watching a channel. The following description of process 600B follows the example above in which John Smith sits in front of TV 158 and uses remote control 260 to control TV 158 and STB 256. Process 600B begins with the user instructing STB 256 to view a channel (block 622). For example, John Smith may instruct STB 256 to display the "History Channel." In this embodiment, volume customization daemon 404 may sense that John has selected a channel.

The rule tables may be queried regarding customization for the particular channel (block 623). Volume customization daemon 404 may query rule tables 500 when the "History Channel" is selected, for example. If there is no rule regarding the channel (block 624: NO) and a volume adjustment is received (block 625) (e.g., a volume up or down press on remote control 260), then the user may be prompted to determine if the user wishes to customize the volume for the channel (block 626). For example, assuming there is no rule for the "History Channel" yet, while watching the "History Channel," John may press the volume-up button on remote control 260. In this case, volume customization daemon 404, may detect the volume-up press and display dialog box 106, as shown in FIG. 1B. In another embodiment, rather than waiting for a volume control button to be pressed on remote control 260, daemon 404 may pause for a period of time before displaying dialog box 106. In this example, the user selects options "YES" or "NO" using remote control 260.

If the user does not wish to customize the volume control for the channel (e.g., a "NO" selection is received) (block 628: NO), then the channel may continue to be played without customizing the volume control for the channel (block 629). In one embodiment, dialog box 106 may be automatically removed if the user does not respond within a certain period of time (e.g., 3, 5, 10, 15, or 30 seconds). While the channel is playing (block 629), the user may still control the volume by using remote control 260.

Figure 7B:
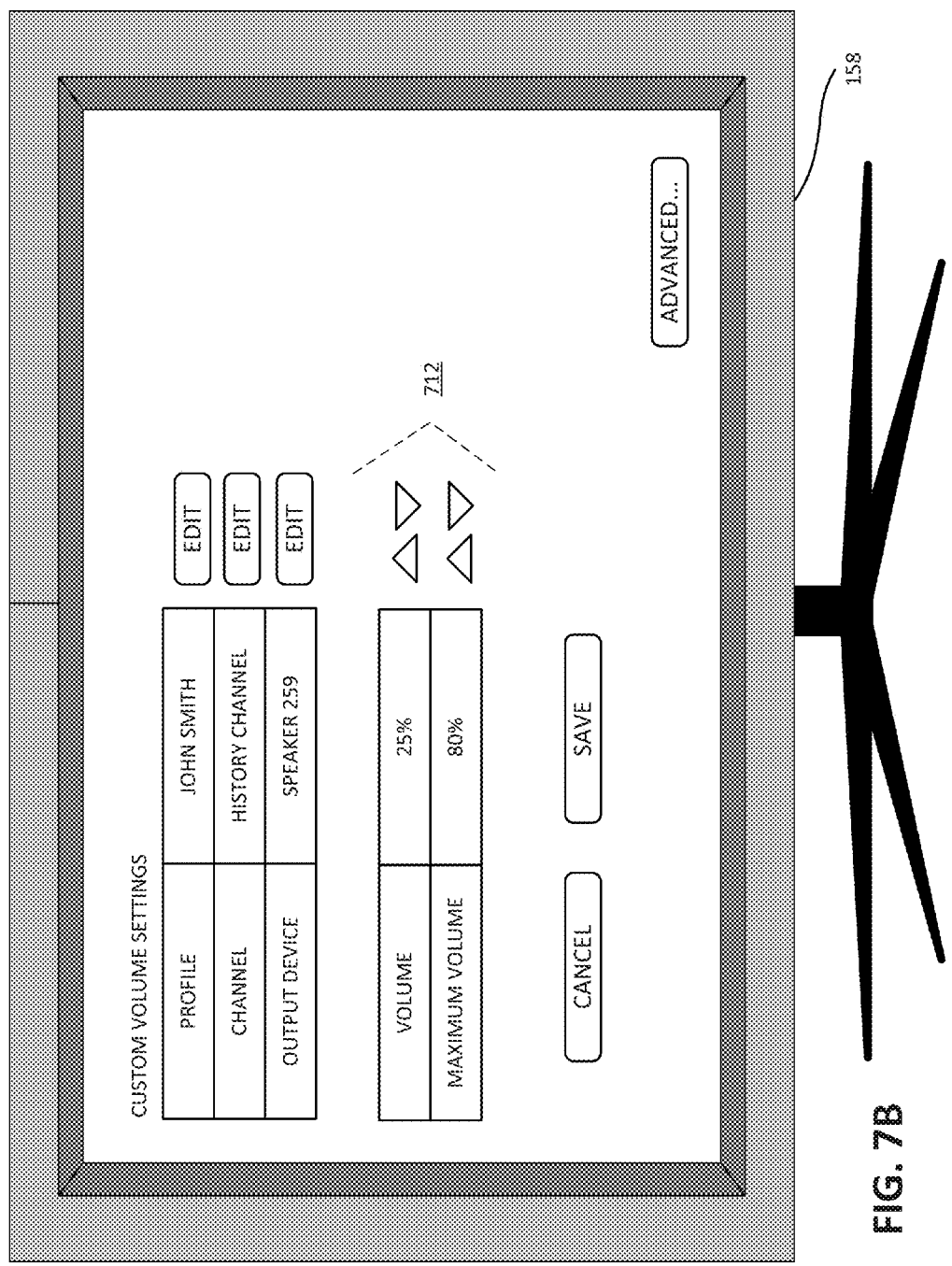

If the user does wish to customize the volume control for the channel (e.g., a "YES" selection is received) (block 628: YES), then volume customization application 402 may be launched (block 630). As shown in FIG. 7B, volume customization application 402 displays a user interface for the user to program custom volume settings for the current channel. In this example, channel field 510 may be populated with the current channel (e.g., the "History Channel"). User profile field 502 and output device 524 may also be automatically populated (e.g., "John Smith," and "Speaker 259"). The user may then add additional conditions by selecting the ADVANCED button. The user may then also add volume control information by selecting the up or down arrows 712 to program volume field 534 and maximum volume field 536. The volume customization settings are received and stored by the volume customization application (block 632). In this fashion, when the channel is selected again (block 622), then the custom volume settings can apply. In addition, upon saving the selections, the channel will be played in accordance with the saved information. In this example, John may save the settings in table 500-2.

If the channel already has custom volume settings (block 624: YES), then the appropriate rule table is queried to determine the volume settings for adjusting the volume accordingly (block 636). For example, the next time John Smith selects the History Channel, he is not prompted and rule table 500-1 is queried for the previously programmed settings. The appropriate parameters may be sensed or determined (block 638). For example, a rule for an application may depend on the time of day (time field 506) or the day of the week (day field 508). In this case, the current time may be determined for comparison to time field 506 or day field 508.

The channel is allowed to play (block 629) with, for example, the adjusted volume. While playing the channel (block 629), the user may still control the volume by using remote control 260. In one embodiment, the user may not increase the volume beyond the volume specified in maximum volume field 536.

Process 600B may also run on a program-basis rather than a channel-basis. For example, using the content name field 505, process 600B may receive a program selection, query rule tables 500, determine whether a rule exists for the selected program, and set the volume accordingly if a rule exists. Otherwise, if a rule does not exist, the user may be prompted for programming a rule for the program.

A user may also launch volume customization application 402 on its own to program or change custom volume settings. In one embodiment, volume customization application 402 queries privileges (e.g., privilege table 408) associated with a profile of the user. In some cases, a user may not have privileges to edit or change some volume customizations. For example, a profile may be established that disallows or prevents a child from editing the maximum volume setting of a game. Rather, the profile may be set to allow the parent of the child to edit the volume setting of the game.

Volume customization daemon 404 may run process 600C as a background process (e.g., a process that is always running). Process 600C may begin with a determination or sensing of parameters that may apply to rules (block 650). These parameters may be determined by the fields stored in rule tables 500. For example, daemon 404 may employ sensor logic 412 to determine the current profile of the user (e.g., John Smith). Sensor logic 412 and/or daemon 404 may determine the time of day, the day of the week, etc. Daemon 404 may employ sensor logic 412 to determine the channel that is being watched, for example, by querying other processes in STB 256. Sensor logic 412 may also determine the program being watched by querying a program guide (e.g., knowing the time, day, and channel), or by information carried in the channel itself. Sensor logic 412 may determine the genre of a program by querying a program guide (e.g., knowing the name of the program). Sensor logic 412 may determine the location of the user, particularly in the case of mobile device 170. Sensor logic 412 may determine the location of the user by querying location services provided by mobile device 170 (e.g., a GPS device, etc.). Sensor logic 412 may determine the ambient noise by using a microphone built into mobile device 170, STB 256, or computer 254. Sensor logic 412 may determine the ambient light by using a photo-sensitive diode in mobile device 170, STB 256, or computer 254. Sensor logic 412 may determine the URL being visited by the user using a web browser. Sensor logic 412 may determine the output device being used (e.g., speaker 257 or speaker 259). Sensor logic 412 may determine who is in the room watching TV 158.

In the following example, sensor logic 412 determines that (1) John Smith is the current profile (e.g., John is logged in), (2) it is 10 p.m. on Friday, (3) an action film is playing on TV 158, and (4) both John Smith and Joe Smith are present in the room watching TV 158. Process 600C may then use the sensed or determined parameters to query rule tables (block 652) to determine if there are any rules to apply to the current parameters. In the current example, rule table 500-3 applies, based on the information stored in fields 502, 506, 508, 514, and 528 illustrated in FIG. 5C. If an applicable rule applies, the volume may be adjusted according to the rule (block 654). In the current example, rule table 500-3 applies and the volume may be adjusted to 80% of the maximum volume automatically.

If there are multiple rule tables that apply (e.g., conflicting rules), then priority field 533 may determine which rule is implemented. Further, in one embodiment, the parameters (block 650) may be determined or sensed continuously, on a regular basis (e.g., once every minute or once every 5, 15, 20, 25, 30, 45, or 60 minutes), or in response to certain events. In the current example, daemon 404 may determine that John and Joe are currently watching TV 158. If Joe leaves the room, then daemon 404 may determine that John is the only person watching TV 158 and may apply a different rule, for example.

Although processes 600A, 600B, and 600C have been described with STB 256, mobile device 170, and computer 254 providing the customization functions, as mentioned above, these functions may be performed "in the cloud" by data center 210 (e.g., customization server 212) and provided "over the top" to a user device, such as STB 256.

Volume customization program 402 and daemon 404 may also be put into a learning mode. In this mode, sensor logic 412 senses the parameters listed in table 500-1. Program 402 and daemon 404 also determine the volume set by the users. Program 402 and daemon 404 then may analyze the information and look for patterns. For example, when a particular person is in the room (e.g., in front of STB 258), the user repeatedly and consistently increase the volume. In this case, when that particular person enters the room, program 402 and daemon 404 may automatically increase the volume. Program 402 and daemon 404 may correlate sensed and determined information (e.g., stored in fields 502-533) with volume information. When patterns are recognized, then program 402 and daemon 404 may set the volume settings stored in fields 534-538. For example, if a user always has the volume turned high when playing music on mobile device 170 (e.g., without external speakers), then this pattern may be learned by program 402 and daemon 404 and settings may be stored in tables 500. When a user consistently turns up the volume when watching TV 158 from afar, this pattern may be recognized by program 402 and daemon 404 and the appropriate settings may be saved in tables 500. When a particular game is played with the volume consistently loud, except when the game is played at night, then this pattern may be recognized and the information stored in tables 500.

As the term is used herein, "program" should be construed to mean any type of content, including music, video, audio, or any combination of audio and video.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Further, certain portions of the invention may be implemented as logic that performs one or more functions. This logic may include hardware, such as an application specific integrated circuit, a field programmable gate array, a processor, or, a microprocessor, or a combination of hardware and software.

No element, act, or instruction used in the description of the present application should be construed as critical or essential to the invention unless explicitly described as such. Also, as used herein, the article "a" and the term "one of" are intended to include one or more items. Further, the phrase "based on" is intended to mean "based, at least in part, on" unless explicitly stated otherwise.

What is claimed is:

1. A computer-implemented method comprising:
   identifying an application launched in a device by a user or identifying a program or a channel selected by the user for playing, wherein the identified application, program, or channel includes audio content;
   querying a database, in response to identifying the application, program, or channel, to determine whether the application, program, or channel is associated with a corresponding set of rules, wherein the database stores a set of rules for each of a plurality of applications, programs, or channels, wherein each of the sets of rules is associated with a plurality of conditions and a plurality of preset volume settings corresponding to the plurality of conditions, wherein the plurality of conditions and the plurality of preset volume settings are customizable by the user, and wherein the plurality of preset volume settings associated with a particular application, program, or channel are applied to all audio content played in association with the particular application, program, or channel;
   adjusting a volume for playing the audio content, according to the corresponding set of rules, when determined that the identified application, program, or channel is associated with the corresponding set of rules, during execution of the identified application or during the playing of the identified program or channel;
   prompting the user to set a new set of rules to associate with the identified application, program, or channel, in response to determining that the identified application, program, or channel is not associated with the corresponding set of rules; and
   receiving from the user in response to prompting the user to set the new set of rules, the new set of rules and associating the new set of rules in the database with the identified application, program, or channel.

2. The computer-implemented method of claim 1, wherein each of the preset volume settings includes a volume level for adjusting the volume of the content included in the corresponding application, program, or channel.

3. The computer-implemented method of claim 2, wherein each of the preset volume settings includes a maximum volume level above which the volume for playing the audio content included in the application, program, or channel cannot exceed.

4. The computer-implemented method of claim 3, wherein the user is associated with a profile, the method further comprising:
   preventing altering of the maximum volume level by the user based on privileges associated with the profile that prevent altering of the maximum volume level.

5. The computer-implemented method of claim 4, wherein the user is a first user and the profile is a first profile, the method further comprising:
   allowing altering of the maximum volume level by a second user based on privileges associated with a second profile that allow altering of the maximum volume level.

6. The computer-implemented method of claim 1, wherein each of the sets of rules includes a time frame during which the corresponding preset volume setting applies.

7. The computer-implemented method of claim 1, wherein identifying the application, program, or channel includes identifying the program selected for playing, wherein the sets of rules corresponding to the selected program includes a genre of programming for which the preset volume setting applies.

8. A device comprising:
   a memory to store instructions; and
   a processor to execute instructions to:
      receive a command initiated by a user to launch an application or to play a channel or a program, wherein the application, channel, or program includes audio content;
      query a database, in response to the received command initiated by the user, to determine whether the application, program, or channel is associated with a set of rules, wherein the database stores sets of rules for each of a plurality of applications, programs, or channels, wherein each of the sets of rules is associated with a set of conditions and a plurality of preset volume settings corresponding to the set of conditions, wherein the sets of conditions and the plurality of preset volume settings corresponding to the sets of conditions are customizable by the user, and wherein the plurality of preset volume settings associated with a particular application, program, or channel are applied to all audio content played in association with the particular application, program, or channel;
      adjust a volume for playing the audio content, according to a corresponding set of rules, when the processor determines that the application, program, or channel is associated with the corresponding set of rules during execution of the application or playing of the channel or the program; and
      prompt the user to set a new set of rules to associate with the application, program, or channel in response to the command initiated by the user, and in response to the application, channel, or program not being associated a corresponding set of rules; and receive from the user, in response to the prompt, the new set of rules and associate the new set of rules in the database with the application, program, or channel.

9. The device of claim 8, wherein each of the preset volume settings includes a volume level for adjusting the volume for playing the audio content included in the corresponding the application, program, or channel.

10. The device of claim 9, wherein each of the preset volume settings includes a maximum volume level above which the volume for playing the audio content included in the corresponding application, program, or channel cannot exceed.

11. The device of claim 10, wherein the user is associated with a profile, and wherein the processor is configured to prevent altering of the maximum volume level by the user based on privileges associated with the profile that prevent altering of the maximum volume level.

12. The device of claim 11, wherein the user is a first user and the profile is a first profile, and wherein the processor is configured to allow altering of the maximum volume level by a second user based on privileges associated with a second profile that allow altering of the maximum volume level.

13. The device of claim 8, wherein each of the sets of rules includes a time frame during which the corresponding preset volume setting applies.

14. The device of claim 8, wherein the processor receives a selection of the program for playing, and wherein the set of rules corresponding to the selected program includes a genre of programming for which the preset volume setting applies.

15. A non-transitory computer-readable medium comprising instructions for execution by a processor, the instructions including:
one or more instructions to identify an application launched in a device by a user or to identify a program or a channel selected by the user for playing, wherein the identified application, program, or channel includes audio content;
one or more instructions to query a database, in response to the identification of the application, the program, or the channel, to determine whether the application, program, or channel is associated with a corresponding set of rules, wherein the database stores a set of rules for each of a plurality of applications, programs, or channels, wherein each of the sets of rules is associated with a set of conditions and a plurality of preset volume settings corresponding to the set of conditions, wherein the sets of conditions and the plurality of preset volume settings corresponding to the sets of conditions are customizable by the user, and wherein the plurality of preset volume settings associated with a particular application, program, or channel are applied to all audio content played in association with the particular application, program, or channel;
one or more instructions to adjust a volume for playing the audio content, according to the corresponding set of rules, when the application, program, or channel is associated with the corresponding set of rules, during execution of the application or playing of the program or channel; and
one or more instructions to prompt the user to set a new set of rules to associate with the identified application, program, or channel, in response to identification of the application, program, or channel, and in response to the determining that the application, program, or channel, is not associated a set of rules; and
one or more instructions to receive from the user, in response to prompting the user to set the new set of rules, the new set of rules and associate the new set of rules in the database with the identified application, program, or channel.

16. The non-transitory computer-readable medium of claim 15, wherein each of the preset volume settings includes a volume level for adjusting the volume for playing the audio content included in the corresponding application, program, or channel.

17. The non-transitory computer-readable medium of claim 15, wherein each of the preset volume settings includes a maximum volume level above which the volume for playing the audio content included in the corresponding application, program, or channel cannot exceed.

18. The non-transitory computer-readable medium of claim 17, wherein the user is associated with a profile, further comprising:
one or more instructions to prevent altering of the maximum volume level by the user based on privileges associated with the profile that prevent altering of the maximum volume level.

19. The non-transitory computer-readable medium of claim 18, wherein the user is a first user and the profile is a first profile, further comprising:
one or more instructions to allow altering of the maximum volume level by a second user based on privileges associated with a second profile that allow altering of the maximum volume level.

20. The non-transitory computer-readable medium of claim 15, wherein each of the sets of rules includes a time frame during which the corresponding preset volume setting applies.

* * * * *